United States Patent

[11] 3,551,746

| [72] | Inventor | Tibor Rubner<br>Pittsburgh, Pa. |
| --- | --- | --- |
| [21] | Appl. No. | 695,020 |
| [22] | Filed | Jan. 2, 1968 |
| [45] | Patented | Dec. 29, 1970 |
| [73] | Assignee | Westinghouse Electric Corporation<br>Pittsburgh, Pa.<br>a corporation of Pennsylvania |

[54] VOLTAGE ACCEPTOR CIRCUIT AND OVERVOLTAGE UNDERVOLTAGE DETECTOR FOR USE THEREIN
24 Claims, 3 Drawing Figs.

[52] U.S. Cl.................................................. 317/26,
307/87, 307/235, 317/31, 317/33
[51] Int. Cl......................................................... H02h 3/36
[50] Field of Search.......................................... 307/87;
317/26, 31, 33; 307/235

[56] References Cited
UNITED STATES PATENTS

| 2,885,568 | 5/1959 | Reeder et al.................. | 307/87 |
| 3,243,658 | 3/1966 | Blackburn..................... | 317/31 |
| 3,399,310 | 8/1968 | Vogler et al................... | 307/87X |
| 3,428,864 | 2/1969 | Barber et al................... | 317/31 |

Primary Examiner—James D. Trammell
Attorneys—A. T. Stratton, C. L. McHale, and M. I. Hull ABSTRACT: An overvoltage-undervoltage detector suitable for use in generator-synchronizing equipment and other electrical apparatus gives a signal suitable for indication or control, such as permitting or preventing electrical connection, when any one of several alternating voltages is outside a certain band, the bandwidth being adjustable, in one embodiment the center voltage of the band also being adjustable. When the invention is used in generator synchronizing equipment, the voltage on an energized line, hereinafter referred to as the "bus voltage," and the voltage of a generator to be connected to the bus are full wave rectified and filtered to obtain direct current voltages. Both these voltages after division are supplied to a level detector including a differential amplifier preferably with positive feedback. In one embodiment, inputs to the level detector are clamped by a Zener diode, the voltage thereacross being selected so that its value corresponds to the voltages obtained when both bus and generator voltages are at the desired voltage. The threshold of the level detector is adjustable and is calibrated to have a value at which the threshold level is exactly the same as the Zener diode voltage while the arm of a potentiometer is at the end thereof of greater voltage. A circuit arrangement of diodes and transistors is provided which senses both undervoltage and overvoltage of either the bus or generator.

In another embodiment the Zener diode is replaced by a variable reference voltage.

INVENTOR
Tibor Rubner

VOLTAGE ACCEPTOR CIRCUIT AND OVERVOLTAGE UNDERVOLTAGE DETECTOR FOR USE THEREIN

CROSS REFERENCE TO RELATED APPLICATIONS

In the copending application of Tibor Rubner et al. for "Automatic Generator Synchronizing and Connecting System and Synchronizer Apparatus for Use Therein," Ser. No. 695,684 filed Jan. 4, 1968, and assigned to the assignee of the instant invention, there is shown and described a complete generator synchronizer circuit for sensing differences in phase, frequency and voltage between two generators, for controlling the speed and varying the excitation of a generator to be connected in parallel with a generator already supplying current to a bus, for ascertaining when the voltages are sufficiently close to permit the generator to be connected to the bus, and when the speed of the generator is increasing at such a rate as to bring the phases of the two generators into the required phase relationship so that they can be connected in parallel on the bus, and if conditions are suitable, operating a circuit breaker for connecting the generator to the bus. The complete generator synchronizer circuit employs a voltage matcher, a speed matcher, a converter, a synchronizer, and a voltage acceptor as basic units of the entire system.

The invention described and claimed herein is a voltage acceptor and overvoltage-undervoltage detector suitable for use in the synchronizing system of the aforementioned copending patent application, and suitable for use in other electrical apparatus.

This application is also related to the copending application of Francis T. Thompson et al. for "Generator Speed Matcher Using Direct Sampling," Ser. No. 695,021, filed Jan. 2, 1968, and assigned to the assignee of the instant invention, said speed matcher being a speed matcher suitable to be employed in the aforementioned copending application of Tibor Rubner et al., as well as having other uses.

A further related application is one by T. Rubner et al. for "Solid State Voltage Matcher and Voltage Difference Detector for Use Therein," Therein," Ser. No. 695,026, filed Jan. 2, 1968.

DESCRIPTION OF THE PRIOR ART

Circuits for detecting when the voltage of a generator connected to an energized line or bus and an additional generator to be connected in parallel are within the range of permissible voltages are old in the art, one such circuit being employed in the "Westinghouse Automatic Synchronizer" shown on page 518 of a work by Alexander S. Langsdorf entitled "Theory of Alternating Current Machinery," McGraw-Hill, Sec. Ed., 1955. Numerous patents directed to automatic paralleling systems have been issued, including U.S. Pat. No. 3,069,555 to L. L. issued Dec. 18, 1962 for "Automatic Paralleling System." A different system is described and claimed in the copending application of William W. Billings et al., for "Automatic Paralleling System," Ser. No. 647,446, filed June 20, 1967, now U.S. Pat. No. 3,444,387, and assigned to the assignee of the instant invention. In addition, automatic paralleling of generators has been described in the literature of the art, for example in an article by Colin Adamson and O. T. Mosland entitled "Automatic Check Synchronizing Equipment Using Static Relaying Principles," Paper No. 3567, Institution of Electrical Engineers, Aug. 1961; and an article by M. J. Brown and W. A. Derr entitled "Automatic Control of Hydroelectric Generating Station," pages 343—355, AIEE Transactions, Volume 66, 1947.

SUMMARY OF THE INVENTION

The circuit employs inputs which are the generator and bus voltages, which are full wave rectified and filtered to obtain direct current voltages, and which are divided to obtain convenient circuit amplitudes. In one embodiment both these last-named direct current voltages are connected to a level detector including a differential amplifier employing two transistors with positive feedback from an additional output transistor. The inputs to the level detector are clamped by a Zener diode which is selected so that its Zener voltage value corresponds to the voltages obtained at resistance voltage dividers within the circuit and having the direct current voltages applied thereacross when both bus and generator voltages have a certain value. The threshold of the level detector is calibrated by a variable resistor in one of the transistor circuits in such a manner that when the wiper arm of a potentiometer in the same transistor circuit is at its uppermost position as shown in the diagram, that is, its position of highest voltage, the threshold level is the same voltage as the Zener diode voltage. Additionally a pair of diodes are provided which are reverse biased when both bus and generator voltages are equal to or less than a selected center voltage. If the bus and generator voltages are within a certain range of each other, and neither deviates from the center voltage by more than a predetermined amount, as established by the threshold control, the circuit supplies no signal output (the output transistor conducts and the voltage at terminal 234 is very small or zero.) If either of the voltages falls below said center voltage by more than the aforementioned predetermined amounts certain diodes will be reverse-biased, and if either of the voltages is above said center voltage by more than the aforementioned predetermined amount, certain diodes will be forward biased, but in both cases the input to the level detector will be below the threshold value, with the result that certain transistors including the output transistor are cutoff. Both the upper and lower voltage limits are adjustable by a single potentiometer adjustment. The output of the circuit is obtained from the collector of the aforementioned additional or output transistor which, in the aforementioned copending application of Tibor Rubner et al., is coupled to a synchronizer logic circuit in such a manner that the synchronizer is disabled when the additional or output transistor is cutoff to provide for proper operation of the circuit described more fully in the copending patent application.

In another embodiment the Zener diode is replaced by a variable reference voltage thus making it possible to adjust the aforementioned center voltage. In this same embodiment when conditions do not permit synchronization, the output transistor is made conductive to bleed the charge from a capacitor in the synchronizer to render the synchronizer inoperative.

DESCRIPTION OF THE PREFERRED EMBODIMENTS

Figure 1:
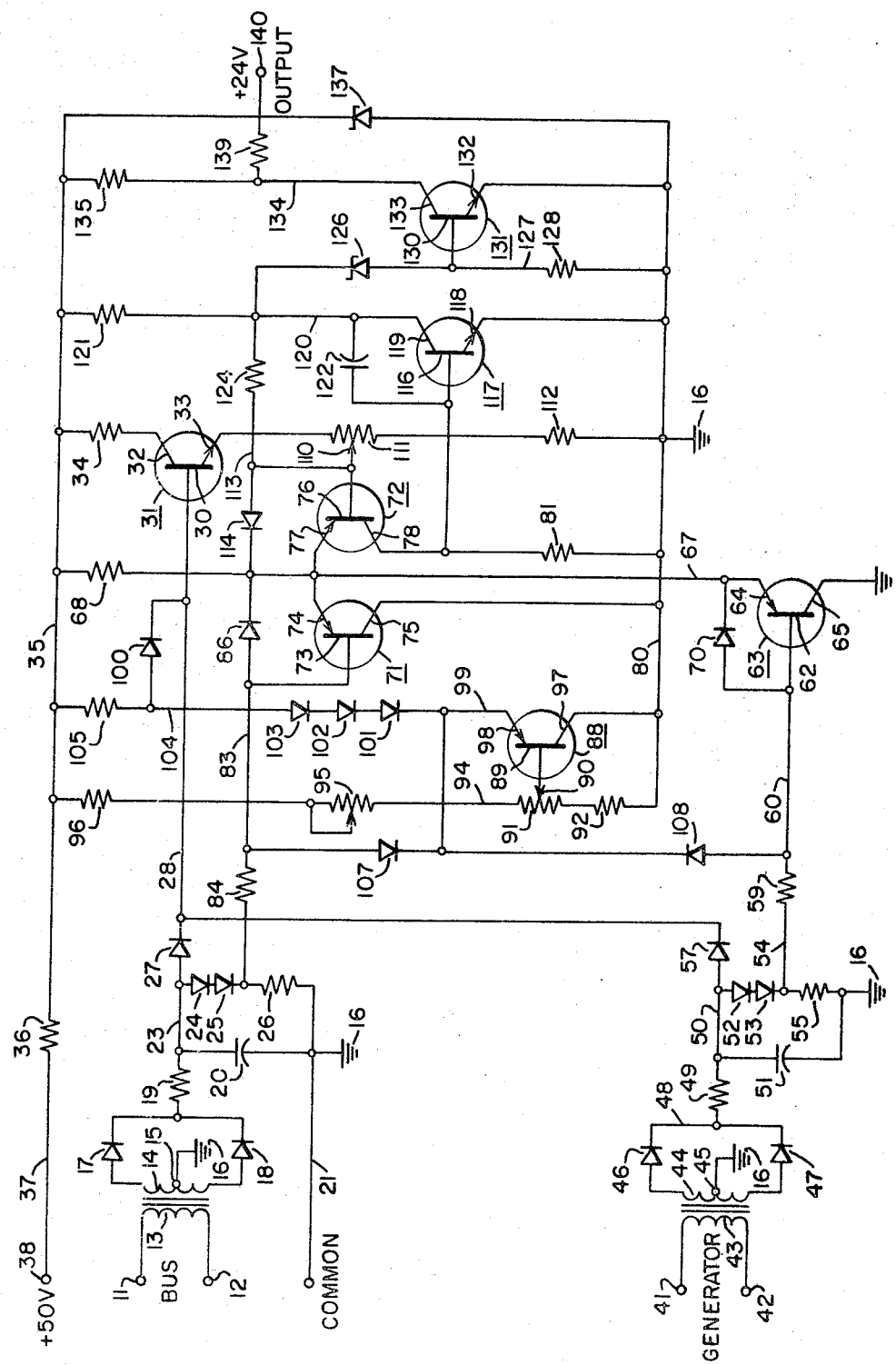
FIG. 1 is a schematic electrical circuit diagram of the overvoltage-undervoltage detector of my invention according to the preferred embodiment thereof.

Particular reference is made now to FIG. 1. Terminals 11 and 12 are connected to the bus (energized line) and thence energize the primary 13 of a transformer having a secondary 13 center tapped at 15, which center tap is connected to ground 16, the terminals of the secondary being connected by way of rectifiers 17 and 18 to one end of resistor 19 which has the other end thereof connected by way of capacitor 20 to ground 16 and lead 21 forming a full wave rectifier and an R-C filter. Lead 23 which interconnects the aforementioned resistor 19 and capacitor 20 is further connected by series-connected diodes 24 and 25 and resistor 26 to the aforementioned lead 21. Lead 23 is further connected by way of diode 27 and lead 28 to the base 30 of an NPN transistor generally designed 31 having a collector 32 and an emitter 33. Collector 32 is connected by way of resistor 34, lead 35, resistor 36 and lead 37 to supply voltage terminal 38 which may be a potential of 50 volts with respect to ground.

As previously stated the circuit of FIG. 1 is also connected to have the voltage of the generator supplied thereto, terminals 41 and 42 being connected across the generator and thence to primary 43 of a transformer having secondary 44 with the center tap 45 thereof connected secondary ground 16 and the terminals thereof connected by way of diodes 46 and 47 to lead 48 and thence by way of resistor 49, lead 50 and capacitor 51 to ground 16. Lead 50 is further connected by way of series-connected diodes 52 and 53, lead 54 and resistor 55 to ground 16. Diodes 46 and 47 constitute a full wave rectifier for the voltage across the aforementioned secondary 44, while resistor 49 and capacitor 51 constitute an R-C filter. It is seen that the direct current voltage on lead 50 is connected by way of diode 57 to the aforementioned lead 28, which is connected to the aforementioned base 30 of transistor 31, so that signals from both the line and the bus are applied to the base of transistor 31.

The aforementioned lead 54 connected at the junction between the diode 53 and resistor 55 is connected by way of resistor 59 and lead 60 to the base 62 of a PNP transistor generally designated 63 having an emitter 64 and a collector 65. Collector 65 is connected to ground 16. Emitter 64 is connected by way of lead 67 and resistor 68 to the aforementioned power supply lead 35. It is seen that diode 70 is connected between base 62 and emitter 64.

The aforementioned two-input level detector includes the three transistors generally designated 63, 71 and 72, transistor 71 having a base 73, emitter 74 and collector 75, and transistor 72 having a base 76, emitter 77 and collector 78. Emitter 74 of transistor 71 is connected to the aforementioned lead 67 and emitter 77 of transistor 72 is connected to the aforementioned lead 67. Collector 75 of transistor 71 is connected directly to lead 80 and to ground 16 whereas collector 78 of transistor 72 is connected by way of resistor 81 to lead 80 and ground 16. The aforementioned base 73 is connected to lead 83 and by way of resistor 84 to the junction between the aforementioned diode 25 and resistor 26. Lead 83 is also connected by way of diode 86 to the aforementioned lead 67.

An additional transistor generally designated 88 is shown having the base 89 thereof connected to the arm 90 of a potentiometer 91 having the lower terminal thereof connected by way of resistor 92 to the aforementioned lead 80 and thence to ground 16, and having the upper end thereof connected by way of lead 94 and the variable resistor or potentiometer 95 and resistor 96 to the aforementioned power input lead 35. The collector 97 of transistor 88 is connected to lead 80 and ground, whereas the emitter 98 thereof is connected to lead 99 and thence by way of series-connected diodes 101, 102 and 103, lead 104 and resistor 105 to the aforementioned power input lead 35. Diode 100 connects lead 104 to lead 28.

The aforementioned lead 83 is also connected by way of diode 107, aforementioned lead 99 and diode 108 to the aforementioned lead 60, it being noted that the diodes 107 and 108 are connected in polarity opposition. The result of this arrangement is that the signals form both leads 83 and 60 are applied to the emitter of the transistor 88. The purpose of the transistor 88 will be described more fully hereinafter.

The base 76 of the aforementioned transistor generally designated 72 comprising part of the two input level detector is connected to the arm 110 of a potentiometer 111, the lower end of the potentiometer 111 being connected by way of resistor 112 to lead 80 and thence to ground 16, the upper terminal of the potentiometer 111 being connected to the emitter 33 of the aforementioned transistor 31. The aforementioned arm 110 of potentiometer 111 is also connected by way of lead 113 and diode 114 to the aforementioned lead 67, it being noted that diodes 114 and 86 are connected in polarity opposition.

The aforementioned collector 78 of transistor 72 of the two input level detectors is connected to the base 116 of an additional transistor generally designated 117 having an emitter 118 directly connected to lead 80 and thence to ground 16, and having a collector 119 connected by way of lead 120 and resistor 121 to the aforementioned supply lead 35. Capacitor 122 is connected between base 116 and collector 119. Lead 120 is also connected by way of resistor 124 to the aforementioned lead 113. Lead 120 is also connected by way of Zener diode 126, lead 127 and resistor 128 to lead 80 and ground.

Lead 127 is connected to the base 130 of an additional transistor generally designated 131 having an emitter 132 directly connected to lead 80 and ground, and having a collector 133 connected by way of lead 134 and resistor 135 to the aforementioned power input lead 35. It is seen that connected between power supply lead 35 and grounded lead 80 there is a further Zener diode 137, and it is seen that an output signal is obtained from the aforementioned lead 134 by way of resistor 139 and delivered to output terminal 140.

Generally speaking, the circuit of FIG. 1 provides an output signal to output terminal 140 (that is, transistor 131 is rendered nonconductive and the DC supply voltage appears on terminal 140) when the bus voltage at terminals 11 and 12 varies from the generator voltage of terminal 41 and 42 by an amount not exceeding a certain predetermined value, in accordance with the adjustment of control circuit, and both voltages are within a tolerance band with respect to the center voltage, in accordance with the setting of arm 110 of potentiometer 111, (the center voltage is adjusted by arm 90 of potentiometer 91). If the variation between the line (generator) and bus voltages exceeds this value, or either the bus voltage or the generator voltage is outside the aforementioned tolerance band, transistor 131 conducts and may be saturated (no signal is applied at the output terminal 140).

The aforementioned rheostat or potentiometer 95 is provided for adjustment purposes, and potentiometer 91, which is a "line (generator) and bus base volts" adjustment, sets the desired operating or center voltage whereas potentiometer 111 which has the arm 110 thereof connected to the base of transistor 72 of the aforementioned two input level detector is a "tolerance from base volts" control which sets the acceptance or tolerance band on either side of the desired operating voltages.

It will be understood that the term "tolerance band" refers not to a relationship between the two voltages, but a relationship to the center voltage, although the two voltages cannot differ by more than the tolerance band, in order to produce an output signal.

In addition to insuring that the line and generator voltages are within desired tolerances the circuit of FIG. 1 prevents false synchronization following temporary loss of bus or generator voltage.

By way of further detailed explanation of the operation of the circuit of FIG. 1, the full wave rectified and filtered line and generator voltages are fed to a two input level detector consisting of transistors 63, 71 and 72, these being heretofore described. As previously explained the base 62 of transistor 63 is connected by way of lead 60, resistor 59 and diodes 53 and 52 to receive the rectified and filtered voltage on line 50 corresponding after division of the generator voltage at terminals 41 and 42. The aforementioned base 73 of transistor 71 is connected by way of lead 83, resistor 84 and diodes 25 and 24 to lead 23 to receive the rectified and filtered voltage thereon corresponding after division to the voltage across the bus at terminals 11 and 12.

The accuracy band or tolerance band adjustment is determined by the setting of the arm 110 of potentiometer 111. The center voltage is adjusted in accordance with the position of the arm 90 of potentiometer 91. Both inputs of the level detector including the aforementioned transistors 63, 71 and 72 are diode-coupled to the emitter of transistor 88. The base of transistor 31 is also diode-coupled to a point three diode drops above the emitter voltage of transistor 88.

Assume by way of description that the center voltage is adjusted for 120 v. and the accuracy band is plus or minus 10 v. Further assume by way of description that the bus voltage is within the required band but the generator voltage is not. If the generator voltage is below 110 v., transistor 63 will conduct, transistors 71, 72 and 117 will be blocked and transistor 131 will conduct, keeping the initial timing capacitor of the synchronizer discharged, since the last-named capacitor, not shown, is connected between terminal 140 and ground. As the generator voltage increases and gets within 120 v. plus or minus 10 v., transistor 63 blocks and transistors 72 and 117 conduct, blocking transistor 131. The initial timing capacitor of the synchronizer can now charge us, as will be more fully explained in the copending patent application. If the generator voltage increases further, the base of transistor 63 will follow until the generator reaches 120 v., the center voltage. At this point the base of transistor 63 will be clamped by rectifier 108 at the emitter voltage of transistor 88. The emitter voltage of transistor 88 is determined by the setting of potentiometer 91. A further increase in generator voltage will forward bias the heretofore reverse-biased diode 57 and will reverse-bias diode 100, the diode 100 being connected between lead 104 and lead 28. The emitter 33 of transistor 31 will follow, increasing the threshold of the level detector. When the generator voltage exceeds 130 v., the threshold will be so high that transistor 63, the base of which is clamped at the emitter voltage of transistor 88, will conduct again, blocking transistors 72 and 117 and saturating transistor 131. The initial timing capacitor of the synchronizer (not shown) will discharge and the synchronizer is inhibited until the generator voltage is once again within the required voltage band.

Particular reference is made now to FIG. 2, of assistance in understanding the circuit of FIG. 1, and FIG. 3 hereinafter to described. Rectifier and filter block designated 144 may include diodes 17 and 18, resistor 19, capacitor 20, diodes 24 and 25 and resistor 26. Rectifier and filter block 145 may include the diodes 46 and 47, resistor 49, capacitor 51, diodes 52 and 53 and resistor 55. These develop two voltages with respect to ground which are applied by way of leads 146 and 147 respectively to a level detector shown in block at 149 and comprising the aforedescribed transistors. Signals on leads 146 and 147 are also applied to the threshold establishing portion of the circuit of FIG. 1 as shown by the block 150, the output lead of level detector 149 being designated 152.

Figure 2:
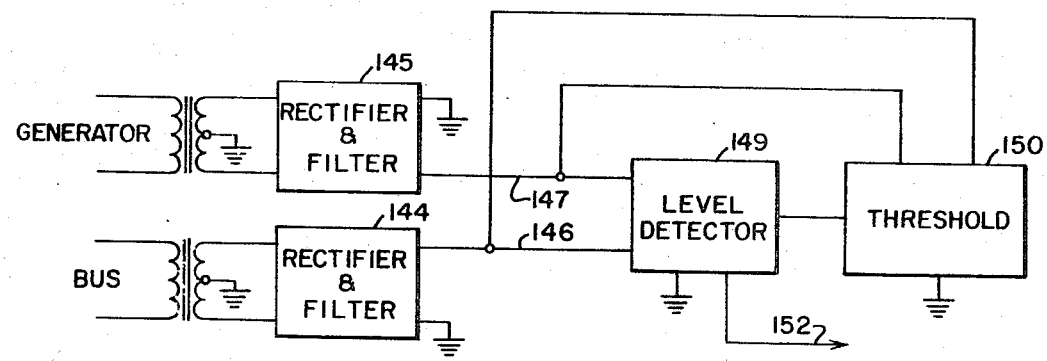
FIG. 2 is a block diagram of assistance in describing the operation of my invention.
Figure 3:
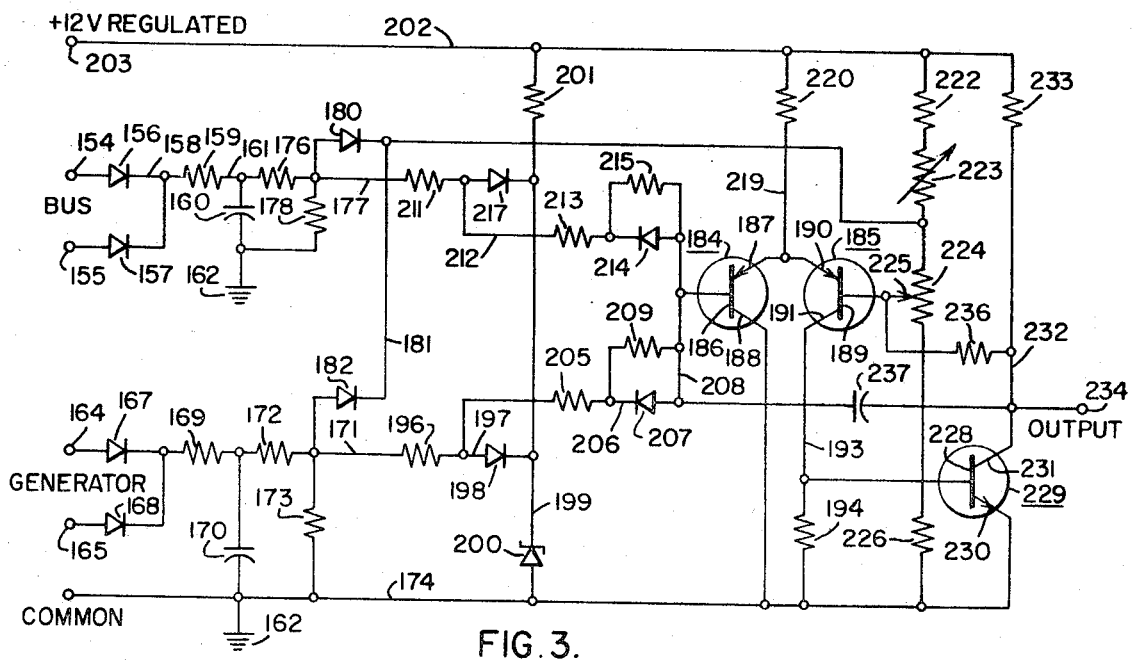
FIG. 3 is a schematic electrical circuit diagram of an overvoltage-undervoltage detector according to an additional embodiment of my invention.

In accordance with whether FIG. 2 shows in blocks FIG. 1 or FIG. 3, level detector 149 may develop a signal on lead 152 (have the supply voltage on lead 152) when conditions are right for synchronization or are not right for synchronization.

Applying FIG. 2 to FIG. 1 just described, it is seen then that there is an output signal on lead 152 (obtained from the power supply voltage) when the two voltages from the bus and generator are within the required range of values, and there is no signal because transistor 131 is saturated when the voltages are not within the required range of values.

Particular reference is made now to FIG. 3 showing a further embodiment of my invention. In FIG. 3 terminals 154 and 155 have a voltage thereacross corresponding to the bus voltage and may be connected to the terminals of secondary 14 of the transformer shown in FIG. 1. Diodes 156 and 157 develop a rectified voltage on lead 158 which is filtered by resistor 159 and capacitor 160, developing a rectified and filtered direct current signal on lead 161 with respect to ground 162. This is divided by resistors 176 and 178 developing a voltage on lead 177 proportional to the line voltage.

In a similar manner, terminals 164 and 165 have a voltage thereacross corresponding to the generator voltage, and may be connected to the secondary 44 of FIG. 1. The signals are rectified by diodes 167 and 168, and filtered by resistor 169 and capacitor 170, thence supplying a signal to lead 171 by way of the voltage divider including resistor 172 and resistor 173, the signal on lead 171 corresponding to the generator voltage and being proportional thereto.

Aforementioned lead 177 is connected by way of rectifier 180, lead 181 and rectifier 182 to aforementioned lead 171. It is to be noted that rectifiers 180 and 182 are connected in polarity opposition with respect to each other but that positive voltages on either lead 177 or lead 171 or both are passed to lead 181.

The differential amplifier or two input level detector includes transistors generally designated 184 and 185, transistor 184 having base 186, emitter 187 and collector 188, and transistor 185 having base 189, emitter 190 and collector 191. Collector 188 is directly connected to the aforementioned lead 174 and ground 162. Collector 191 is connected by way of lead 193 and resistor 194 to lead 174.

It is seen that the aforementioned lead 171 is connected by way of resistor 196, lead 197, diode 198, lead 199 and Zener diode 200 to the aforementioned lead 174 and ground. Lead 199 is connected by way of resistor 201 to lead 202 which is connected to terminal 203 of a source of direct current potential for energizing the circuit, which may be 12 v. with respect to ground.

The aforementioned lead 197 is connected by way of resistor 205, lead 206, diode 207 and lead 208 to the aforementioned base 186 of transistor 184. Diode 207 has resistor 209 connected thereacross.

The aforementioned lead 177 is connected by way of resistor 211, lead 212, resistor 213 and diode 214 to the aforementioned lead 208 and thence to base 186 of transistor 184. Diode 214 has resistor 215 connected thereacross. The aforementioned lead 212 is connected by way of diode 217 to the aforementioned lead 199.

Both emitter 187 of transistor 184 and emitter 190 of transistor 185 are connected by way of lead 219 and resistor 220 to the aforementioned power supply lead 202.

Connected between power supply lead 202 and lead 174 which is connected to ground 162 there is seen to be a resistance voltage dividing network including, in series, resistor 222, variable resistor 223, one terminal of a potentiometer 224 having arm 225, the other terminal of the potentiometer 224 being connected by way of resistor 226 to lead 174. Arm 225 of potentiometer 224 is connected to the base 189 of transistor 185. The junction between variable resistor 223 and potentiometer 224 is connected to lead 181.

The aforementioned lead 193 is connected to the base 228 of a further transistor generally designated 229 having an emitter 230 directly connected to lead 174, and having a collector 231 connected by way of lead 232 and resistor 233 to the aforementioned power supply lead 202, lead 232 also being connected to output terminal 234. The lead 232 is also connected by way of resistor 236 to the aforementioned arm 225 of potentiometer 224, and lead 232 is also connected by way of capacitor 237 to the aforementioned lead 208 and thence to the base 186 of the transistor generally designated 184.

The operation of the voltage sensor circuit of FIG. 3 is as follows: The inputs to the circuit are the generator and bus voltages, which may be obtained from the secondaries of the same transformers which feed the synchronizer. The bus and generator voltages are full wave rectified and filtered to obtain direct current voltages. Both these voltages after division are connected to the level detector including the differential amplifier of transistors 184 and 185 with positive feedback from the output transistor generally designated 229. The inputs to the level detector are clamped by Zener diode 200, which has been selected so that its Zener voltage corresponds to the voltage obtained at the potential dividers, one of these including resistors 176 and 178, and the other including resistors 172 and 173, when both line and generator voltages are 120 v. The threshold of the level detector is calibrated by variable resistor 223 in such a manner that when the potentiometer 224 is adjusted for 120 plus or minus 0 v., that is, the wiper arm 225 is in the uppermost position as the potentiometer is shown in the diagram, the threshold level is exactly at the same voltage as the Zener diode 200 voltage.

While the value of the threshold level is influenced by resistor 222, potentiometer 223, potentiometer 224 and resistor 226, it is also influenced by the current flowing through diodes 180 and 182. These diodes 180 and 182 are reverse-biased if both line and generator voltages are equal to or less than 120 v. (and the threshold is adjusted to 120 v. plus or minus 0 v., since 120 v. (as divided) corresponds to the Zener diode voltage of Zener diode 200.

If both voltages are exactly at 120 v., transistor 184 will be just cut off, and transistors 185 and 229 will conduct. If either of the voltages falls below 120 v., either diode 217 or 198 will be reverse-biased, and one input to the level detector will be below the threshold value. Transistor 184 conducts and transistors 185 and 229 are cut off. If either of the voltage is above 120 v., either diode 180 or diode 182 will conduct, and extra current will flow through potentiometer 224 and resistor 226. The threshold voltage increases in value while the input voltages to the level detector are clamped by Zener diode 200. Transistor 184 conducts and transistors 185 and 229 are cut off. It is thus seen that the circuit senses both undervoltage and overvoltage. It is also seen that both upper and lower limits are adjustable by a single adjustment on potentiometer 224.

The output of the circuit is obtained from the collector of transistor 229 which is coupled to the synchronizer logic in such a manner that the synchronizer is disabled when transistor 229 is cut off.

Resistor 139, FIG. 1, may have a value of 2 kilohms, so that the aforementioned capacitor in the synchronizer of the copending application is rapidly discharged through saturated transistor 131, quickly inhibiting the synchronizer.

The term "signal" as used herein includes the appearance of the supply voltage or a portion thereof at terminals 234 or 140 while transistors 229 or 131 respectively are cut off. It should be recalled that as the signals are selectively used in the aforementioned copending application Ser. No. 695,684, in one embodiment (FIG. 3) the presence of a "signal" at the output terminal disables the synchronizer, while in the other embodiment (FIG. 1) the absence of a signal at the output terminal disables the synchronizer (transistor 131 is saturated).

The foregoing written description and the drawings are illustrative and exemplary only and should not be interpreted in a limiting sense.

I claim:

1. In overvoltage-undervoltage detector apparatus, in combination, a level detector, and circuit means connected to the level detector and adapted to operatively connect the level detector to a first source of voltage and to a second source of voltage, said circuit means including threshold level establishing means operatively connected to the level detector, the level detector including a first controlled device which conducts when neither of the first and second voltages deviates from said threshold level by an amount greater than a predetermined amount and a second controlled device which conducts when either one of said first and second voltages deviates from the threshold level in either sense by an amount greater than said predetermined amount.

2. Apparatus according to claim 1 including means dividing the voltage from the first source and means dividing the voltage from the second source to obtain first and second other voltages proportional to the first and second named voltages, and in which said threshold level is established with reference to the first and second other voltages.

3. Apparatus according to claim 1 including variable means for establishing a tolerance band of adjustable width with reference to a center voltage, said predetermined amount by which the tolerance band permits deviation form the center voltage.

4. Apparatus according to claim 1 wherein the threshold level establishing means includes variable means for adjusting the value of the threshold level.

5. Apparatus according to claim 3 including variable means for adjusting the value of the ce nter voltage and wherein the means for establishing a tolerance band includes means for establishing a band the width of which remains substantially unchanged when the center voltage is altered.

6. Apparatus according to claim 1 including in addition an output device operatively connected to the level detector, said output device delivering a signal while the first controlled device conducts.

7. Apparatus according to claim 1 including in addition an output device operatively connected to the level detector, said output device delivering a signal while the second controlled device conducts.

8. Apparatus according to claim 1 in which the first and second controlled devices are transistors each having at least a base, emitter, and collector.

9. Apparatus according to claim 8 in which the threshold level establishing means includes potentiometer means and a source of potential causing a voltage across the potentiometer means, said potentiometer means having the arm thereof operatively connected to the base of one of said transistors.

10. Apparatus according to claim 2 including a Zener diode connected in circuit having a Zener voltage corresponding to a voltage which clamps the threshold level at a preselected value.

11. Apparatus according to claim 1 in which the first and second voltage sources are alternating current and the circuit means includes means for separately rectifying and filtering the alternating current voltages to obtain two direct current voltages varying in accordance with variations in the two alternating voltages respectively.

12. Apparatus according to claim 9 wherein the circuit means includes in addition a pair of diodes, one of said diodes being reverse-biased when one of the voltages from the first and second sources exceeds the other, the other of said diodes being reverse-biased when the other voltage exceeds said one voltage, said diodes controlling the voltage applied to the potentiometer of the threshold level establishing means whereby the threshold level is varied.

13. Apparatus according to claim 8 including in addition a third transistor and circuit means interconnecting the third transistor and the level detector to provide positive feedback for the level detector.

14. Overvoltage-undervoltage detector apparatus including means for obtaining a first voltage after division which varies with variations in the output voltage of a generator to be connected to a bus, means connected to the bus for obtaining a second voltage after division which varies with variations in the voltage on the bus, a level detector including two similar transistors each having at least a base, emitter and collector, means including voltage divider means for applying an adjustable voltage to the base of one transistor to establish a threshold level, first diode means operatively connecting the first voltage obtaining means to the voltage divider means, second diode means operatively connecting the second voltage obtaining means to the voltage divider means so that the voltage from the first voltage obtaining means and the voltage from the second voltage obtaining means tend to forward bias the first and second diode means respectively and tend to reverse-bias the second and first diode means respectively whereby whichever one of said voltages is greater is applied to said voltage divider means and controls said threshold level, both the first voltage from the first voltage obtaining means and the second voltage from the second voltage obtaining means being applied as an input to the other of said transistors, and an output transistor operatively connected to the level detector to supply positive feedback thereto said output transistor being rendered nonconductive when the first voltage and the second voltage differ from each other by at least a predetermined amount.

15. Apparatus according to claim 14 including in addition Zener diode means for clamping the inputs to the level detector portion.

16. In overvoltage-undervoltage detector apparatus, in combination, means adapted to be electrically connected to a bus and to a generator for obtaining alternating current voltages therefrom, first and second rectifier and filter means for separately rectifying and filtering the voltages from the bus and generator, level detector means including a differential amplifier operatively connected to the first and second rectifier means, and threshold establishing means operatively connected to the first and second rectifier means and to the level detector means.

17. In overvoltage-undervoltage detector apparatus according to claim 16, a level detector constructed and arranged to supply an output signal when said generator and bus voltages differ from each other by a predetermined amount and to supply no output signal when the generator voltage is within a predetermined range of the bus voltage and the center voltage.

18. Overvoltage-undervoltage detector apparatus comprising, in combination, first and second rectifier and filter means adapted to be operatively connected to a bus and generator both alternating current for obtaining direct current voltages which vary respectively with variations in the voltages from the bus and generator, level detector means including first and second transistor means, circuit means connecting the level detector means to the means for obtaining first and second direct current voltages, the circuit means including means for establishing an accuracy band corresponding to the limit within which the voltages may acceptably vary between the bus and generator with respect to an established center voltage, the circuit means further including means for establishing a voltage level and center voltage level within the circuit, and output transistor means operatively connected to the level detector means.

19. A circuit according to claim 18 including a further transistor operatively connected to the first and second rectifier and filter means and to the level detector means for further adjusting the center voltage.

20. In an overvoltage-undervoltage detector, a level detector means including a differential amplifier for obtaining a first direct current voltage which varies with variations in the voltage on an energized alternating current bus, means for obtaining a second direct current voltage which varies with variations in the voltage of a generator, and circuit means including output signal generating means for applying the first and second direct current voltages to the level detector whereby an output signal is selectively generated, in accordance with the relationship between the value of the first direct current voltage and the value of the second direct current voltage.

21. An overvoltage-undervoltage detector according to claim 20 in which an output signal is generated selectively in accordance with whether the first and second direct current voltages are both within a selected range of voltages and are within a preselected tolerance band with respect to a selected center voltage.

22. An overvoltage-undervoltage detector according to claim 20 in which an output signal is generated only when the first and second direct current voltages are within a selected range of voltages and are within the tolerance band.

23. An overvoltage-undervoltage detector according to claim 21 including means whereby when at least one of said first and second direct current voltages exceeds a predetermined value, the threshold level of the level detector is automatically adjusted in accordance with the instant value of said one direct current voltage.

24. In overvoltage-undervoltage detector apparatus, in combination, a level detector including a differential amplifier adapted to be connected to a first source of voltage and to a second source of voltage, and threshold-level-establishing means operatively connected to the level detector, the level detector including means adapted to selectively produce a signal output in accordance with the voltage relationship of at least one of the voltages to said threshold level.